July 11, 1933.  F. C. MORRIS  1,917,993
BRAKE ELEMENT
Original Filed Oct. 5, 1928
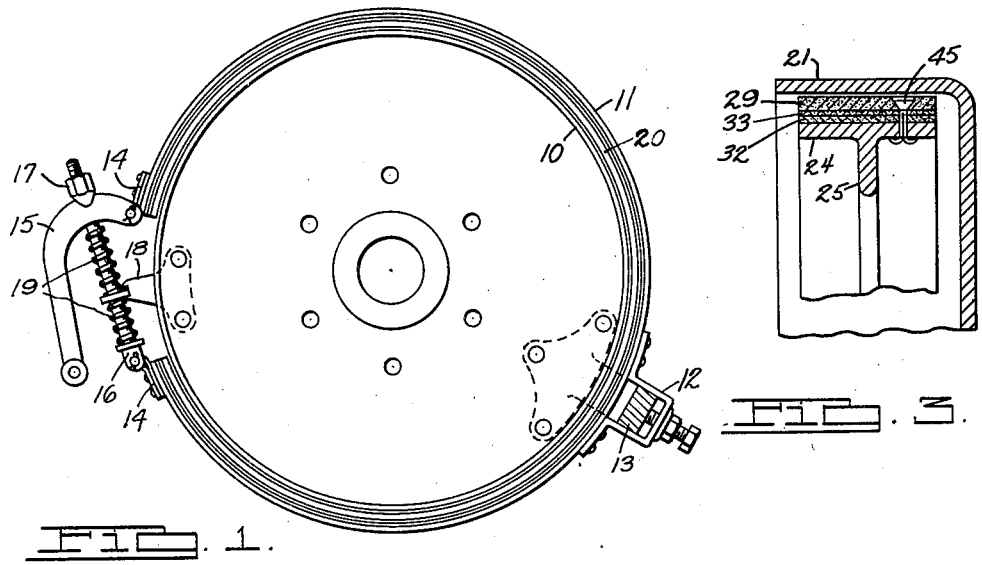
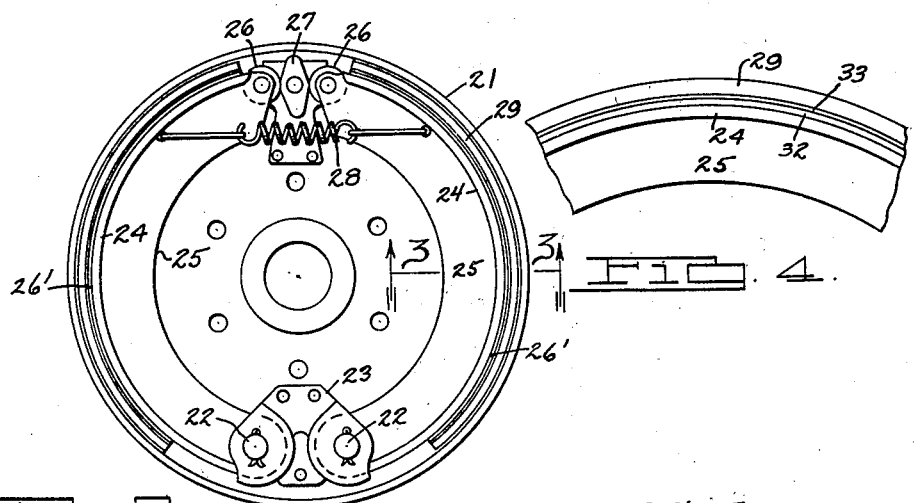
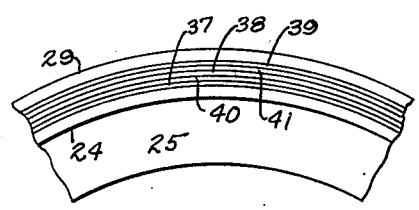
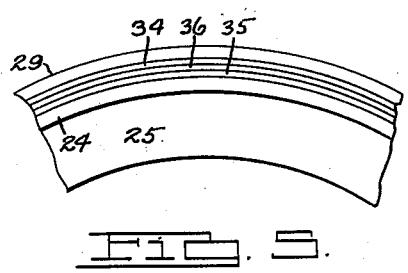
INVENTOR
Fred C. Morris.
BY
Harness, Dickey, Pierce & Haun
ATTORNEYS.

Patented July 11, 1933

1,917,993

UNITED STATES PATENT OFFICE

FRED C. MORRIS, OF SAN FRANCISCO, CALIFORNIA

BRAKE ELEMENT

Original application filed October 5, 1928, Serial No. 310,471. Divided and this application filed October 1, 1930. Serial No. 485,673.

As in the instance of an application filed by me, bearing Serial Number 310,471, which was filed October 5, 1928, and of which application this is a division, the invention involved in this application relates to brake mechanism of the type employed by automobile manufacturers for retarding the rolling movement of the vehicle.

The present invention is primarily concerned with brake linings and mountings for the same and the principal object of the invention is to provide a method and a means for mounting a brake lining on a brake shoe which will increase the efficiency of the brake and provide a more perfect support for the lining.

Another object of the invention is to provide a brake lining cushion which is disposed between the lining and the brake shoe, the cushion including means precluding distortion of the cushion under the heat and pressure of a braking action.

Other objects of the invention, not at this time more particularly enumerated, will become more readily apparent as the nature of the invention is better understood, and the same consists in the novel construction, combination, and arrangement of parts shown in the accompanying single sheet of drawings, in which—

Fig. 1 is a side view of an external contracting brake band shown in operative position with respect to a brake drum.

Fig. 2 is a side view of a brake drum provided with internal expanding brake shoes.

Fig. 3 is a sectional view of the brake element and lining shown in Fig. 2, taken along the line 3—3 of Fig. 2.

Fig. 4 is a fragmentary side view of a brake element manufactured in accordance with the principles of the present invention, a different form of securing means between the shoe and lining being employed in this case.

Fig. 5 is a fragmentary side view showing a modified form of construction.

Fig. 6 is a fragmentary side view showing a still further modified form of construction.

In all of the above described views like characters of reference are employed to designate like parts throughout.

Referring now to Fig. 1 a brake band of the externally contracting type is shown. The brake drum 10 is surrounded by a flexible split band 11 which band is supported at a point opposite the split through a bracket 12 by a member 13 which may be suitably secured to a supporting member such as a dust cover (not shown), as in the case in conventional constructions. The free ends of the band 11 are provided with members 14 which are formed with eyes to one of which members is pivotally connected an arm 15 and to the other of which is pivotally connected a rod 16. The rod 16 projects through the arm 15 near its point of pivot and is provided with an adjusting member 17 thereon. The free ends of the band are supported relative to the drum 10 through the arm 15 and the rod 16 by means of a bracket 18 suitably secured to a supporting surface (not shown) and encircling the rod 16 between its point of pivot and the arm 15. Suitable springs 19 encircle the rod 16 on each side of the support 18, constantly urging the ends of the band outwardly with respect to the drum.

The brake lining is shown at 20 and is spaced from the bands 11 by means of a resilient cushion formed of the same material as is employed in connection with the brake shoe and lining shown in Figs. 2 to 6, inclusive, and which will be presently described. The lining 20 may be secured to the bands 11 with the resilient cushion interposed by the use of rivets such as 45 as is common in conventional constructions.

The above mentioned parts, with the exception of the mention of the layer of cushioning material 21, are purely conventional as is their design as shown in the accompanying drawing and described in this specification, and no claim is made as to their novelty outside of their general combination with such layer, the invention consisting rather in the provision of the brake element and lining with such backing layer interposed between them, as will be more fully described hereinafter.

Referring now to Fig. 2, the brake drum is shown at 21 and within this drum is pivotally supported on pins 22, carried by a bracket 23, a pair of brake shoes 26'. Each of these brake shoes 26' is provided with an arcuate face flange portion 24 and a radially extending flange or web 25. The free ends of the shoes are provided with rollers 26 which are constantly urged into contact with an externally operated expanding cam 27 by means of a coil spring 28. The shoes are each provided with a brake or friction lining 29, which is secured to the shoe with the resilient cushion interposed. In Figs. 3 and 4 this resilient cushion between the lining and the shoe is in the form of a strip of vulcanizable material 32 vulcanized to a strip of fabric 33. While this fabric may be of any suitable material, it is preferable that the same be in the form of canvas or duck on account of the relatively non-stretching characteristics of these fabrics. The surface of the fabric 33 is preferably frictioned by the application of a small amount of rubber thereto. While it is preferable that the above construction be employed as shown, it is obvious that the position of the vulcanizable material and the fabric may be reversed so that the vulcanizable material is positioned in contact with the lining 20 and the fabric material is in contact with the flange 24. Irrespective of these details of manufacture, however, the essential features of the invention are not altered.

The construction shown in Fig. 4 may be varied as indicated in Fig. 5 in which the resilient strip is shown as being made of a pair of rubber strips 34 and 35 separated by and vulcanized to a fabric strip 36, and this modification may be carried still further as indicated in Fig. 6 in which three layers of rubber 37, 38 and 39 are employed and in which the layers 37 and 38 are separated by and vulcanized to a strip of fabric 40 and the layers 38 and 39 are separated and vulcanized to a strip of fabric 41.

In all of the above described modifications, various means may be employed for securing the fabric to the rubber. A simple process of vulcanizing is effective and under certain conditions is rendered still more effective when the fabric is previously impregnated with the vulcanizable material or with one of its compounds.

As it is apparent that the resilient cushion must be of a softer nature than the lining 29 itself where it is desired to utilize the same as a cushion member, but which is not altogether essential in the broader aspects of this invention, the vulcanizing operation may be controlled so that partial polymerization results.

I claim:

1. In combination, a brake element provided with a supporting surface, and a brake lining secured to said surface in generally spaced relationship by a spacer member, said member comprising a strip of material substantially co-extensive with said lining and composed of a layer of rubber and a layer of fabric.

2. In combination, a brake element provided with a supporting surface, and a brake lining secured to said surface in generally spaced relationship by a spacer member, said member comprising a strip of material substantially co-extensive with said lining and composed of superposed layers of rubber and fabric, including two layers of one material separated by and vulcanized to a layer of the other material.

3. In combination, a brake element provided with a supporting surface, and a brake lining secured to said surface in generally spaced relationship by a spacer member, said member comprising a strip of material substantially co-extensive with said lining and composed of a plurality of alternate layers of rubber and fabric.

4. In combination, a brake element provided with a supporting surface, and a brake lining secured to said surface in generally spaced relationship by a spacer member, said member comprising a strip of material substantially co-extensive with said lining and composed of a plurality of alternate layers of rubber and fabric.

FRED C. MORRIS.